United States Patent
Pfeiler

(10) Patent No.: US 7,469,813 B2
(45) Date of Patent: Dec. 30, 2008

(54) DEVICE AND METHOD FOR JOINING THE FACES OF PARTS

(75) Inventor: Hans Pfeiler, Leoben (AT)

(73) Assignee: voestalpine Schienen GmbH, Leoben (AT)

(*) Notice: Subject to any disclaimer, the term of this patent is extended or adjusted under 35 U.S.C. 154(b) by 59 days.

(21) Appl. No.: 10/804,132

(22) Filed: Mar. 19, 2004

(65) Prior Publication Data
US 2004/0256439 A1 Dec. 23, 2004

(30) Foreign Application Priority Data
Mar. 21, 2003 (AT) .............................. A 455/2003

(51) Int. Cl.
*B23K 20/12* (2006.01)
(52) U.S. Cl. ..................... 228/112.1; 228/212
(58) Field of Classification Search .............. 228/112.1
See application file for complete search history.

(56) References Cited

U.S. PATENT DOCUMENTS

| | | | | |
|---|---|---|---|---|
| 3,184,841 A | * | 5/1965 | Jones et al. ............... 228/110.1 |
| 3,564,703 A | | 2/1971 | Kiwalle |
| 3,732,613 A | | 5/1973 | Steigerwald |
| 3,823,862 A | * | 7/1974 | Reedy et al. .................. 228/4.1 |
| 3,860,468 A | * | 1/1975 | Scherer ...................... 156/73.5 |
| 3,901,497 A | * | 8/1975 | Dearman ...................... 269/37 |
| 4,195,828 A | * | 4/1980 | Peterson ....................... 269/43 |
| 4,470,868 A | * | 9/1984 | MacLaughlin et al. ....... 156/423 |
| 5,237,892 A | * | 8/1993 | Fry .............................. 74/603 |
| 5,697,545 A | * | 12/1997 | Jennings et al. ........... 228/112.1 |
| 5,865,430 A | * | 2/1999 | Conover et al. ................ 269/43 |
| 5,975,405 A | * | 11/1999 | Tsuchiya et al. ............ 228/44.5 |
| 6,029,727 A | | 2/2000 | Nomura et al. |
| 6,105,849 A | | 8/2000 | Mochizuki et al. |
| 6,357,506 B1 | | 3/2002 | Nomura et al. |
| 6,840,433 B2 | * | 1/2005 | Vermaat ...................... 228/212 |

FOREIGN PATENT DOCUMENTS

| | | |
|---|---|---|
| DE | 19807457 | 9/1998 |
| EP | 0707919 | 4/1996 |
| EP | 0920948 | 6/1999 |

(Continued)

OTHER PUBLICATIONS

Patent Abstracts of Japan JP2002153975.

(Continued)

*Primary Examiner*—Kiley Stoner
(74) *Attorney, Agent, or Firm*—Greenblum & Bernstein, P.L.C.

(57) ABSTRACT

Device for joining faces of parts having great longitudinal extension by friction welding. The device includes first and second clamping arrangements structured and arranged to position ends of the parts against one another. At least one of the first and second clamping arrangements are axially movable with respect to another of the first and second clamping arrangements. At least one of the first and second clamping arrangements are movable along a direction that is parallel to a part cross-sectional plane, whereby the part cross-sectional plane is define by an end face of one of the parts. This Abstract is not intended to define the invention disclosed in the specification, nor intended to limit the scope of the invention in any way.

24 Claims, 1 Drawing Sheet

FOREIGN PATENT DOCUMENTS

| | | |
|---|---|---|
| GB | 1293531 | 10/1972 |
| GB | 1324431 | 7/1973 |
| GB | 1481215 | 7/1977 |
| JP | 61078596 A * | 2/1986 |
| RU | 145120 | 2/1960 |
| RU | 329700 | 3/1970 |
| RU | 1002120 | 4/1981 |
| RU | 1098721 | 6/1984 |

OTHER PUBLICATIONS

Patent Abstracts of Japan JP6312279.
English language translation of Soviet Union 1002120, Apr. 1981.
English language translation of Soviet Union 145120, Feb. 1960.
English language translation of Soviet Union 329700, Mar. 1970.
English language translation of Soviet Union 1098721, Jun. 1984.
Pages 146-149 of 1987 Reference Book (in Russian) entitled Friction Welding.
English language translation of pp. 146-149 of 1987 Reference Book (in Russian) entitled Friction Welding.
English language Abstract of JP 05-131280.

* cited by examiner

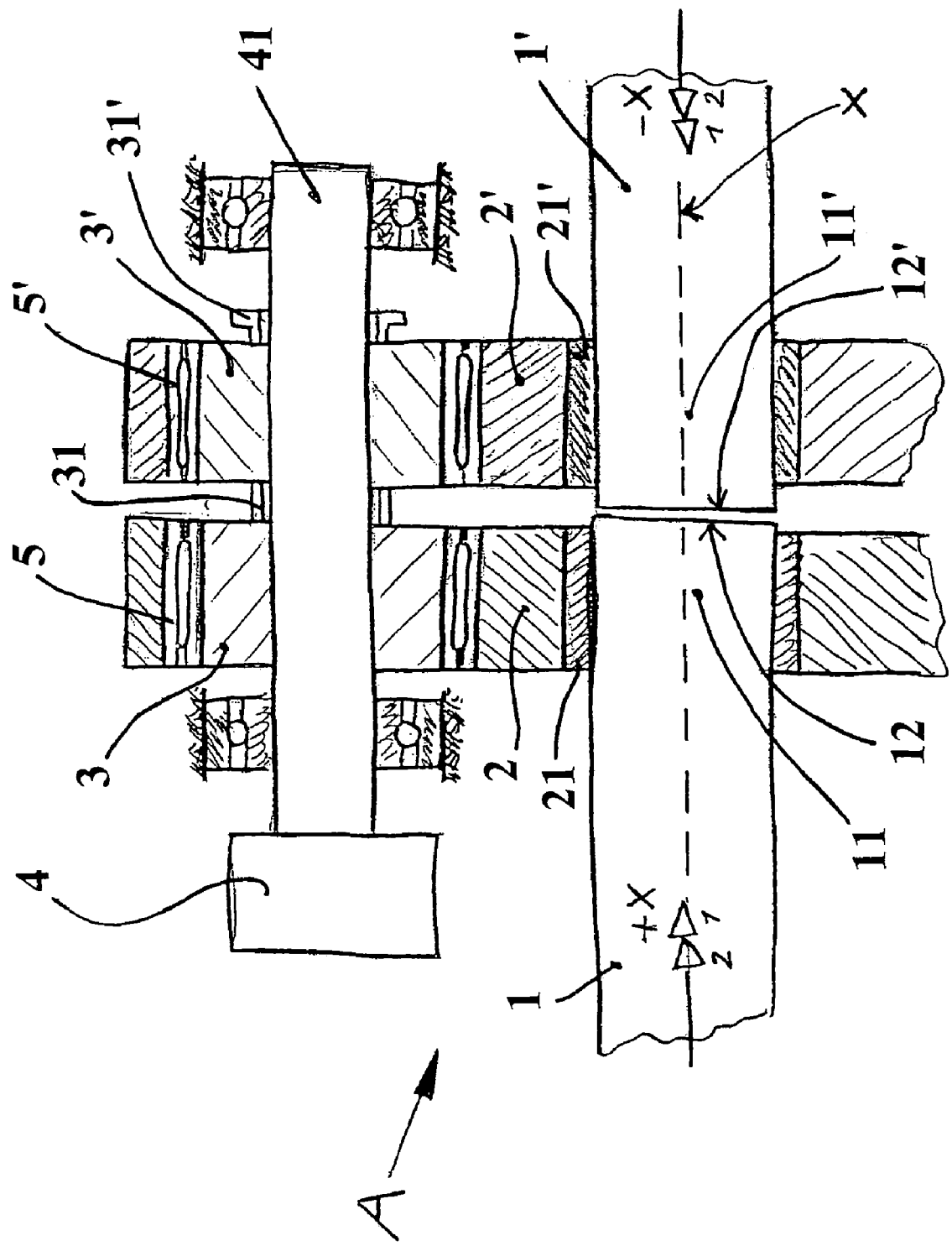

DEVICE AND METHOD FOR JOINING THE FACES OF PARTS

CROSS-REFERENCE TO RELATED APPLICATIONS

The instant application claims priority under 35 U.S.C. §119 of Austrian Application No. A455/2003 filed on Mar. 21, 2003, the disclosure of which is expressly incorporated by reference herein in its entirety.

BACKGROUND OF THE INVENTION

1. Field of the Invention

The invention relates to a device and a method for joining the faces of parts with great longitudinal extension by friction welding. In particular, the invention relates to a device and a method for the axially aligned joining of rails and the like by friction welding.

2. Description of the Prior Art

Joining by welding is characterized according to DIN 1910 in that the cohesion of the parts is achieved through material fusion with the use of heat and/or force. The parting line between the workpieces is eliminated through the metallic bonding of their materials.

In friction welding, the surfaces of the workpieces or parts to be joined are moved relative to one another under pressure and the surface areas are heated through the friction, after which a positioning or pressing of the parts against one another occurs with metallic bonding of the same.

By means of friction welding chiefly parts having a rotationally symmetrical shape can be joined to one another or attached to workpieces, whereby at least one part is rotated about its axis, thus moved relative to the opposite part, and is positioned against a further part or workpiece under pressure.

Through the frictional heat released at the positioning surfaces, a heating of the surface areas occurs to a temperature at which the material of the part begins to soften. The actual welding results during the resting of the part(s) and an increased pressing of the positioning surfaces, a so-called bearing pressure, to obtain a secure metallic bonding of the materials.

Friction welded joints and devices for their production can have great importance and be very cost-effective for special materials and a joining of small or compact parts with a short time-consumption; however, with rods and the like with great longitudinal extension, a rotational movement of the same for the friction heating of the joint areas is often possible only with the greatest effort and, in many cases, only theoretically possible.

In particular with long rods with profiled cross section, such as, e.g., rails or beams, an axially aligned joining with alignment of the cross-sectional profile through friction welding does not seem cost-effective and cannot be produced with a necessary joint quality.

A method for joining railway tracks by friction welding is known from DE 198 07 457 A1 in which an intermediate piece is moved in linear or orbital oscillation between the rail ends to be connected. The two rail ends are thereby pressed toward one another onto the intermediate piece in the longitudinal direction of the rail in order to generate the heat necessary for welding through friction energy on both contact surfaces between each of the rail ends and each of the cut surfaces of the intermediate piece.

However, such a rail joint, which is expensive to produce, results in respectively two weld transitions that result in an increase of potential weak points that will possibly need to be tested extensively. Furthermore, guiding the temperature in the joint area during friction welding as well as system-dependent functional operations can be more difficult to control while maintaining quality.

SUMMARY OF THE INVENTION

The invention provides for a device of the type mentioned at the outset with which long rods with profiled cross section, such as rails, can be joined to one another by friction welding in a rail production, whereby an axially aligned alignment and a cross-sectionally conformal, high-quality, metallic joining of the parts can be achieved.

The invention also provides for a generic method for the friction welding of rods, in particular rails, with which method an all-over, homogenous, cross-sectionally conformal, metallic joining of the ends can be achieved with a high quality of the joint area.

The invention also provides for a friction welding device which features clamping arrangements for positioning the part ends against one another. At least one clamping arrangement can be moved relative to the opposite one, and parallel to the part cross-sectional plane in an axially divergent manner. The at least one clamping arrangement can be positioned in an axially aligned manner to the part with freedom of movement.

The advantages obtained with the invention are essentially that the functions necessary for a friction welding of the parts with high quality can be adjusted in a precisely controlled manner. Cross-sectionally conformal friction weld joints of, e.g., rails, can thus be produced, whereby only one easily removable lateral elevation of small dimension is formed in the weld area.

If, as can be provided according to the invention, at least one clamping arrangement can be moved in a circulating manner around the joint axis, a favorable homogenous heating of the part ends can result over the entire cross-sectional area.

According to one embodiment of the invention, it is advantageous if both clamping arrangements can be moved in the same direction in a circulating manner around the joint axis at a respectively opposite spacing from the same. This embodiment of the device renders possible on the one hand a homogenous heating of the provided joint area of the parts through friction with largely shockless movement operations that are favorable in terms of mechanical engineering; on the other hand an immediate axially aligned positioning of the part ends with freedom of movement is advantageously possible for the actual joining operation through eliminating the deflection.

Both with regard to a movement that is as shockless as possible and for the sake of a quick way of adjusting the part ends to be welded, it is favorable if a drivable eccentric arrangement that can be adjusted in the divergence from the rotational axis is provided for the movement and for the axially aligned resting position of a clamping arrangement.

A particular advantage in connection with the movement operations is obtained if two drivable eccentric arrangements are provided per clamping arrangement and operatively connected to it.

An embodiment of the device according to the invention in which the opposite clamping arrangement respectively can be driven by adjustable eccentric arrangements positioned on a shaft or can be adjusted with freedom of movement, whereby a divergence from the rotational axis preferably in the opposite direction and an axially aligned alignment of the part ends are provided by a control of the eccentric arrangements that preferably acts simultaneously, does not only have advantages in terms of control technology but also renders possible a construction method that is favorable in terms of cost-effectiveness and industrial engineering.

The invention also provides for a method of the type mentioned at the outset in that the part ends are provided with flat axially normal cross-sectional surfaces, and subsequently in a heat-up step the cross-sectional surfaces to be joined are pressed against one another and at least one part end is moved in an axially divergent manner relative to the opposite one and in this manner the face areas are brought to an increased temperature or joining temperature, at which an axially aligned alignment of the parts takes place with free movement of the same and the weld area is placed under increased pressure for the all-over metallic bonding of the part ends.

The advantages of a welding process conducted in this manner are mainly that the friction movement occurs without a rotation of the parts and so no high forces of gravity arise with a change in movement of the same. At least one part end is thereby moved in an oscillating manner relative to the opposite one under pressing pressure in a direction that lies in the cross-sectional plane. After the joint parameters have been achieved on the friction surfaces, only low forces are necessary for the end-side free movement of the parts in order to conduct a cross-sectionally conformal positioning of the same. If one part end is moved in the cross-sectional plane with elastic bending of the part end area in a favorable manner for friction heating, the restoring forces lead or at least help to establish an axially aligned alignment of the parts for the bearing pressure, whereby a single high-quality metallic bond can thus be achieved.

For a largely shockless sequence of movements, it has proven favorable for at least one part end to be moved in a circulating manner to increase the temperature or to adjust the joint temperature of the face areas of the parts.

In a particularly preferred embodiment of the invention, if the part ends under pressurization are moved around the alignment or joint axis in the same direction in a circulating manner at an opposite spacing respectively to the axis to increase the temperature of the face areas of the parts, good all-over weld joints can be achieved in a highly effective manner with furthermore reduced shocks in the system, and the respective movements of the part end areas can be reduced. The expenditure for a free movement of the part ends is thus also reduced in terms of industrial engineering.

For an axially aligned alignment of parts with special cross-sectional formats provided in the joint process, followed by a welding with the highest quality, it can be advantageous if, after the pressing together of the cross-sectional surfaces and the axially divergent movement of the part ends to heat them, the pressing force is reduced, an axial alignment of the parts is carried out and subsequently an increased pressing pressure is built up for the metallic bonding of the same.

Parts, such as rails of hardenable steels and alloys, can have areas with an unfavorable, brittle microstructure in the welding joint and/or in the heat-affected zone when a joint is produced by friction welding. This structure, e.g., martensite structure, develops when the material austenitizes during welding, i.e., is converted into a cubic face-centered atomic structure, and, after the joining of the parts, the cooling rate, in particular a thermal dissipation in the part, is so great that the structural transformation takes place in a suddenly diffusionless manner. According to the invention this disadvantage can be overcome in that a pre-heating of the face surface areas of the part ends takes place before the heating step.

A pre-heating of the face surface areas of the part ends can be carried out with particular advantage through relative movement of the same towards one another with reduced positioning pressure, whereby on the one hand the welding device can thereby be used in a favorable manner for heating the part ends and an oxidation of the welding surfaces can be prevented.

The invention also provides for a device for joining faces of parts having great longitudinal extension by friction welding, wherein the device comprises first and second clamping arrangements structured and arranged to position ends of the parts against one another. At least one of the first and second clamping arrangements is axially movable with respect to another of the first and second clamping arrangements. At least one of the first and second clamping arrangements is movable along a direction that is parallel to a part cross-sectional plane, whereby the part cross-sectional plane is define by an end face of one of the parts.

The first and second clamping arrangements may be structured and arranged to axially aligned the parts. The parts may comprise rods having a profiled cross section. The rods may comprise rails. At least one of the first and second clamping arrangements may be movable in a circulating manner around a joint axis. The first and second clamping arrangements may be movable in the same direction in a circulating manner around a joint axis. The first and second clamping arrangements may be movable in the same direction in a circulating manner around a joint axis and while having an opposite spacing.

The device may further comprise first and second drivable eccentric arrangements. The first and second drivable eccentric arrangements may be movably adjustable. The first and second drivable eccentric arrangements may be structured and arranged to axially aligned the first and second clamping arrangements. The first and second drivable eccentric arrangements may be structured and arranged to axially aligned the first and second clamping arrangements in a resting position.

The device may further comprise two drivable eccentric arrangements, wherein at least one of the two drivable eccentric arrangements is operatively connected to at least one of the first and second clamping arrangements.

The device may further comprise at least one adjustable eccentric arrangement driving one of the first and second clamping arrangements. The at least one adjustable eccentric arrangement may be one of positioned on a shaft adjustable with freedom of movement.

The device may further comprise at least one device for controlling the at least one adjustable eccentric arrangement.

The device may further comprise first and second adjustable eccentric arrangements driving the first and second clamping arrangements.

The device may further comprise first and second control devices for controlling the first and second adjustable eccentric arrangements.

The first and second adjustable eccentric arrangements may function simultaneously.

The invention also provides for a method for joining parts having great longitudinal extension by friction welding using the device described above wherein the method comprises arranging ends of the parts opposite one another, wherein the ends are provided with flat axially normal cross-sectional surfaces, pressing the cross-sectional surfaces against one another by moving at least one of the ends axially relative to another of the ends, such that face areas of the ends are brought to one of an increased temperature or a joining temperature, and axially aligning the parts, wherein the pressing produces a metallic bonding of the parts.

The invention also provides for a method for joining parts having great longitudinal extension by friction welding, wherein the method comprises arranging ends of the parts opposite one another, wherein the ends are provided with flat axially normal cross-sectional surfaces, pressing the cross-sectional surfaces against one another by moving at least one of the ends axially relative to another of the ends, such that face areas of the ends are brought to one of an increased temperature or a joining temperature, and axially aligning the parts, wherein the pressing produces a metallic bonding of the parts.

The pressing may produce an all-over metallic bonding of the ends of the parts. The pressing may produce weld area and takes place under increased pressure. The parts may comprise rods having a profiled cross section. The rods may comprise rails.

The method may further comprise moving the end of at least one of the parts in a circulating manner to one of increase a temperature and adjust a joint temperature.

The method may further comprise moving the end of at least one of the parts in a circulating manner to adjust a temperature of a joint, whereby the joint is formed between face areas of the ends of the parts.

The method may further comprise moving the ends of the parts relative to a joint axis to cause in increase in temperature.

The method may further comprise moving the ends of the parts around a joint axis.

The method may further comprise moving the ends of the parts in the same direction around a joint axis.

The method may further comprise moving the ends of the parts around a joint axis in a circulating manner.

The method may further comprise moving the ends of the parts relative to an alignment axis to cause an increase in temperature.

The method may further comprise moving the ends of the parts around an alignment axis.

The method may further comprise moving the ends of the parts in the same direction around an alignment axis.

The method may further comprise moving the ends of the parts around an alignment axis in a circulating manner.

The method may further comprise, after the pressing and before the axially aligning, reducing a pressing force. The method may further comprise, after the reducing, increasing a pressing pressure.

The method may further comprise, before the pressing, pre-heating the ends of the parts.

The method may further comprise, before the pressing, moving the ends relative to each other with a reduced positioning pressure, whereby the moving causes pre-heating of the ends of the parts.

The invention also provides for a device for friction welding parts, wherein the device comprises first and second clamping arrangements structured and arranged to position ends of the parts against one another. At least one of the first and second clamping arrangements is axially movable with respect to another of the first and second clamping arrangements. First and second moving devices are provided for respectively moving the first and second clamping arrangements along a direction that is parallel to a part cross-sectional plane. First and second control devices are provided for controlling movement of the first and second moving devices. The part cross-sectional plane is define by an end face of one of the parts.

The invention also provides for a method for joining two parts by friction welding using the device described above wherein the method comprises arranging ends of the two parts opposite one another, pressing the ends against one another by moving at least one of the ends axially relative to another of the ends, moving the ends relative to each other along a direction which is parallel to an end surface of at least one of the ends, axially aligning the parts, and metallically bonding the ends of the two parts.

The invention also provides for a device for friction welding parts, wherein the device comprises first and second clamping arrangements structured and arranged to position ends of the parts against one another. At least one of the first and second clamping arrangements are axially movable with respect to another of the first and second clamping arrangements. First and second eccentric moving devices are mounted to a shaft. The first and second eccentric moving devices respectively move the first and second clamping arrangements along a direction that is parallel to an end face of at least one of the parts. A motor drives the shaft. First and second control device are provided for controlling movement of the first and second eccentric moving devices. The part cross-sectional plane is define by an end face of one of the parts.

BRIEF DESCRIPTION OF THE DRAWINGS

The invention is described in further detail below on the basis of a drawing showing an exemplary embodiment.

The only FIGURE shows in diagrammatic form a friction welding device A.

DETAILED DESCRIPTION OF THE PRESENT INVENTION

Clamping arrangements 2, 2' are provided for parts 1, 1' to be joined. The first and second clamping arrangements are detachably connected to the part ends 11, 11' by clamp parts 21, 21'. The clamping arrangements 2, 2' are operatively connected to at least respectively one adjustable eccentric arrangements 3, 3' that can be driven by way of a shaft 41 by a motor 4 or the like, whereby the amount of eccentricity can be adjusted through a control 31, 31' of the eccentric arrangements 3, 3'.

If the eccentric arrangements 3, 3' are now driven in a rotary manner by a motor 4 via a shaft 41 and their eccentricity is adjusted by control means 31, 31' in different directions, in particular in opposite directions, an uneven, in particular opposite, oscillation of the respective eccentric surfaces occurs in the direction towards the part ends 11, 11' to be welded. However, the eccentric arrangements 3, 3' are operatively connected to the clamping arrangements 2, 2', if necessary via bearings 5, 5', and consequently the part ends 11, 11' clamped in them can be moved relative to one another. Another support (not shown) of the clamping arrangements 2, 2' can be carried out via moveable bearings or eccentric arrangements if necessary driven at the same angular velocity. During a friction welding process parts 1, 1' to be joined with their part ends 11, 11' are clamped with axially normal flat cross-sectional surfaces 12, 12' in clamping arrangements 2, 2' by clamp parts 21, 21' and positioned against one another with a force or opposing force +x1,−x1. A relative or friction movement occurs at the part cross-sectional surfaces 12, 12' between the opposite part ends 11, 11' during the action of a positioning force through an uneven axially divergent movement of the clamping arrangements 2, 2'. Such a relative movement of the clamping arrangements 2, 2' is caused by an uneven adjustment of the eccentricity of the eccentric arrangement 3 operatively connected to them, which eccentric arrangements are driven on a shaft 41 in front of a motor 4.

A relative movement during positioning of the cross-sectional surfaces 12, 12' against one another releases friction heating that heats the cross-sectional surface areas to a joint temperature. After such a temperature is reached, a canceling of the eccentricity of the eccentric arrangements 3, 3' occurs directly and simultaneously through a control 31, 31', and through this an axially aligned free movement of the part ends with a subsequent pressurization or force +x2,−x2 of the cross-sectional surfaces 12, 12'.

After a cooling of the formed welding zone of the parts, if necessary with a reduced cooling rate effected by a pre-heating of the part ends 11, 11' to adjust specific material properties in this area, a material crushing effected by a last pressurization or a bearing pressure can be mechanically removed and a profile-conformal joint can thus be achieved.

The invention claimed is:

1. A method for joining long parts wherein a long part is defined as a part comprising an end, an opposite end, and having a profiled cross-section and a length which is greater than an overall width of the profiled cross-section by friction welding using a device for joining faces of the parts by friction welding, the device comprising first and second clamping arrangements structured and arranged to position ends of the parts against one another, at least one of the first and second clamping arrangements being axially movable with respect to another of the first and second clamping arrangements, and at least one of the first and second clamping arrangements being movable along a direction that is parallel to a part cross-sectional plane defined by an end face of one of the parts, the method comprising:

clamping the parts in first and second clamping arrangements, the first clamping arrangement surrounding a portion of the end of one of the parts and the second clamping arrangement surrounding a portion of the end of another of the parts, wherein the first clamping arrangement is closer to the end than the opposite end of the one of the parts and the second clamping arrangement is closer to the end than the opposite end of the other of the parts;

arranging the ends of the parts opposite one another, wherein the ends are provided with flat axially normal cross-sectional surfaces;

pressing the cross-sectional surfaces against one another and moving an axis of at least one of the parts relative to an axis of another of the parts, such that face areas of the ends are brought to one of an increased temperature or a joining temperature;

axially aligning the parts; and;

metallically bonding the parts, wherein, during the pressing, the parts do not rotate and at least one of the ends of the parts is moved around a joint axis in a circulating manner.

2. The method of claim 1, further comprising, after the axially aligning, forcing the ends of the parts together.

3. A method for joining long parts wherein a long part is defined as a part comprising an end, an opposite end, and having a profiled cross-section and a length which is greater than an overall width of the profiled cross-section by friction welding, the method comprising:

clamping the parts in first and second clamping arrangements, the first clamping arrangement clamping a portion of the end of one of the parts and the second clamping arrangement clamping a portion of the end of another of the parts, wherein the first clamping arrangement is closer to the end than the opposite end of the one of the parts and the second clamping arrangement is closer to the end than the opposite end of the other of the parts;

arranging the ends of the parts opposite one another, wherein the ends are provided with flat axially normal cross-sectional surfaces;

pressing the cross-sectional surfaces against one another by moving at least one of the ends axially relative to another of the ends, such that face areas of the ends are brought to one of an increased temperature or a joining temperature;

axially aligning the parts; and metallically bonding the parts, wherein, during the pressing, the parts do not rotate and at least one of the ends of the parts is moved around a joint axis in a circulating manner.

4. The method of claim 3, further comprising, after the axially aligning, forcing the ends of the parts together to produce an all-over metallic bonding of the ends of the parts.

5. The method of claim 3, wherein the pressing produces a weld area and takes place under increased pressure.

6. The method of claim 3, wherein the parts comprise rods having a profiled cross section.

7. The method of claim 6, wherein the rods comprise rails.

8. The method of claim 3, further comprising moving the end of at least one of the parts in a circulating manner to one of increase a temperature and adjust a joint temperature.

9. The method of claim 8, further comprising moving the end of at least one of the parts in a circulating manner to adjust a temperature of a joint, whereby the joint is formed between face areas of the ends of the parts.

10. The method of claim 3, further comprising moving the ends of the parts relative to a joint axis to cause in increase in temperature.

11. The method of claim 3, further comprising moving the ends of the parts around a joint axis.

12. The method of claim 3, further comprising moving the ends of the parts in the same direction around a joint axis.

13. The method of claim 3, further comprising moving the ends of the parts around a joint axis in a circulating manner.

14. The method of claim 3, further comprising moving the ends of the parts relative to an alignment axis to cause an increase in temperature.

15. The method of claim 3, further comprising moving the ends of the parts around an alignment axis.

16. The method of claim 3, further comprising moving the ends of the parts in the same direction around an alignment axis.

17. The method of claim 3, further comprising moving the ends of the parts around an alignment axis in a circulating manner.

18. The method of claim 3, further comprising, after the pressing and before the axially aligning, reducing a pressing force.

19. The method of claim 18, further comprising, after the reducing, increasing a pressing pressure.

20. The method of claim 3, further comprising, before the pressing, pre-heating the ends of the parts.

21. The method of claim 3, further comprising, before the pressing, moving the ends relative to each other with a reduced positioning pressure, whereby the moving causes pre-heating of the ends of the parts.

22. A method for joining two long parts wherein a long part is defined as a part comprising an end, an opposite end, and having a length which is greater than an overall width of the profiled cross-section by friction welding using a device for friction welding parts, the device comprising first and second clamping arrangements structured and arranged to position ends of the parts against one another, at least one of the first and second clamping arrangements being axially movable with respect to another of the first and second clamping arrangements, first and second moving devices for respectively moving the first and second clamping arrangements along a direction that is parallel to a part cross-sectional plane, and first and second control devices for controlling movement of the first and second moving devices, wherein the part cross-sectional plane is define by an end face of one of the parts, the method comprising:

clamping the parts in first and second clamping arrangements, the first clamping arrangement surrounding a portion of one of the parts and the second clamping arrangement surrounding a portion of another of the parts, wherein the first clamping arrangement is closer to the end than the opposite end of the one of the parts and the second clamping arrangement is closer to the end than the opposite end of the other of the parts;

arranging ends of the two parts opposite one another;

pressing the ends against one another by moving at least one of the ends axially relative to another of the ends;

moving the ends relative to each other along a direction which is parallel to an end surface of at least one of the ends;

axially aligning the parts; and metallically bonding the ends of the two parts, wherein, during the pressing, the parts do not rotate and at least one of the ends of the parts is moved around a joint axis in a circulating manner.

23. The method of claim 1, further comprising clamping the parts in first and second clamping arrangements, the first clamping arrangement surrounding a portion of one of the parts and the second clamping arrangement surrounding a portion of another of the parts.

24. The method of claim 3, further comprising clamping the parts in first and second clamping arrangements, the first clamping arrangement surrounding a portion of one of the parts and the second clamping arrangement surrounding a portion of another of the parts.

* * * * *